Aug. 18, 1931.  M. H. TONCRAY  1,819,212
DOORSTOP STRAP
Filed Feb. 27, 1928  2 Sheets-Sheet 2
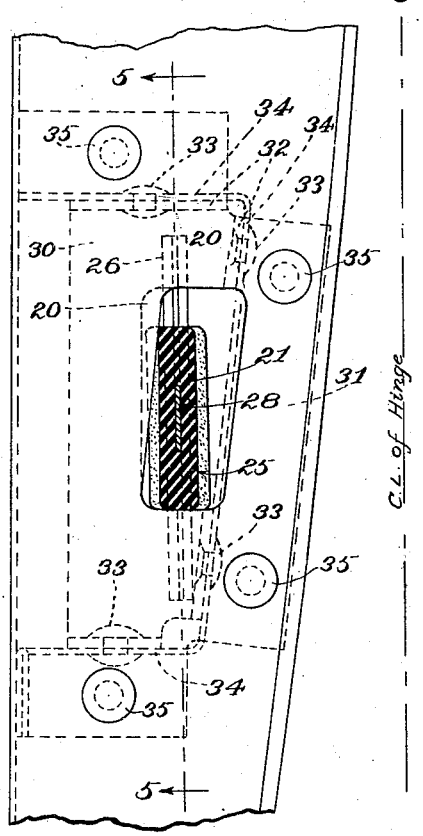
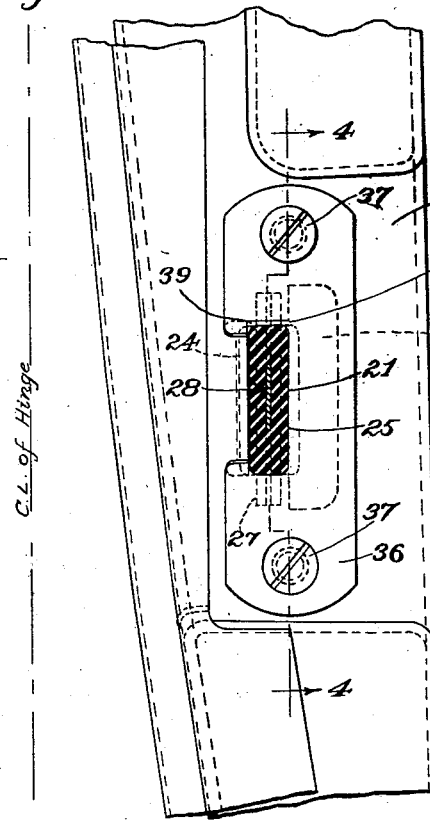
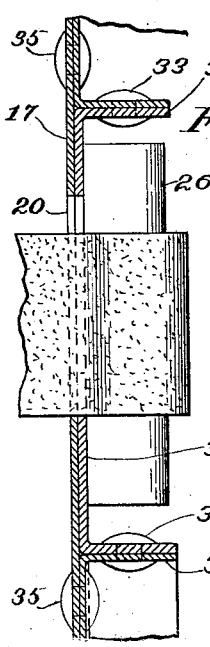
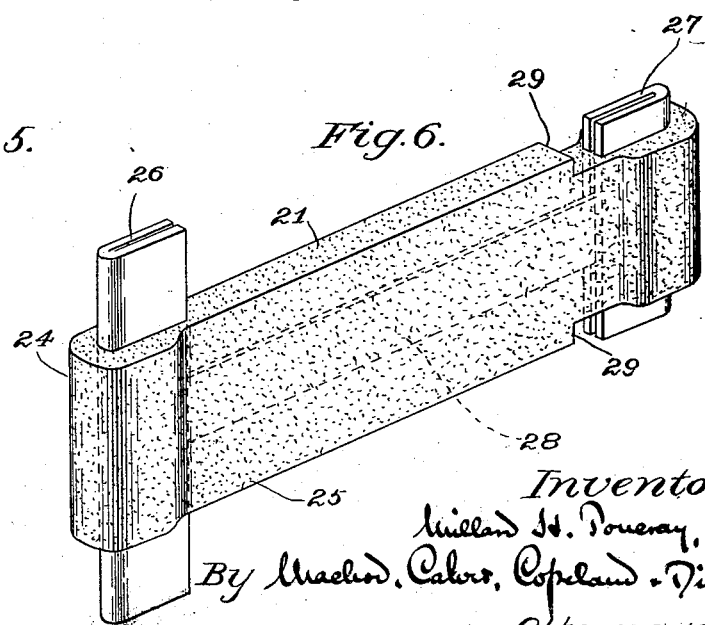
Inventor:
Millard H. Toncray,
By MacLeod, Calver, Copeland & Dike,
Attorneys.

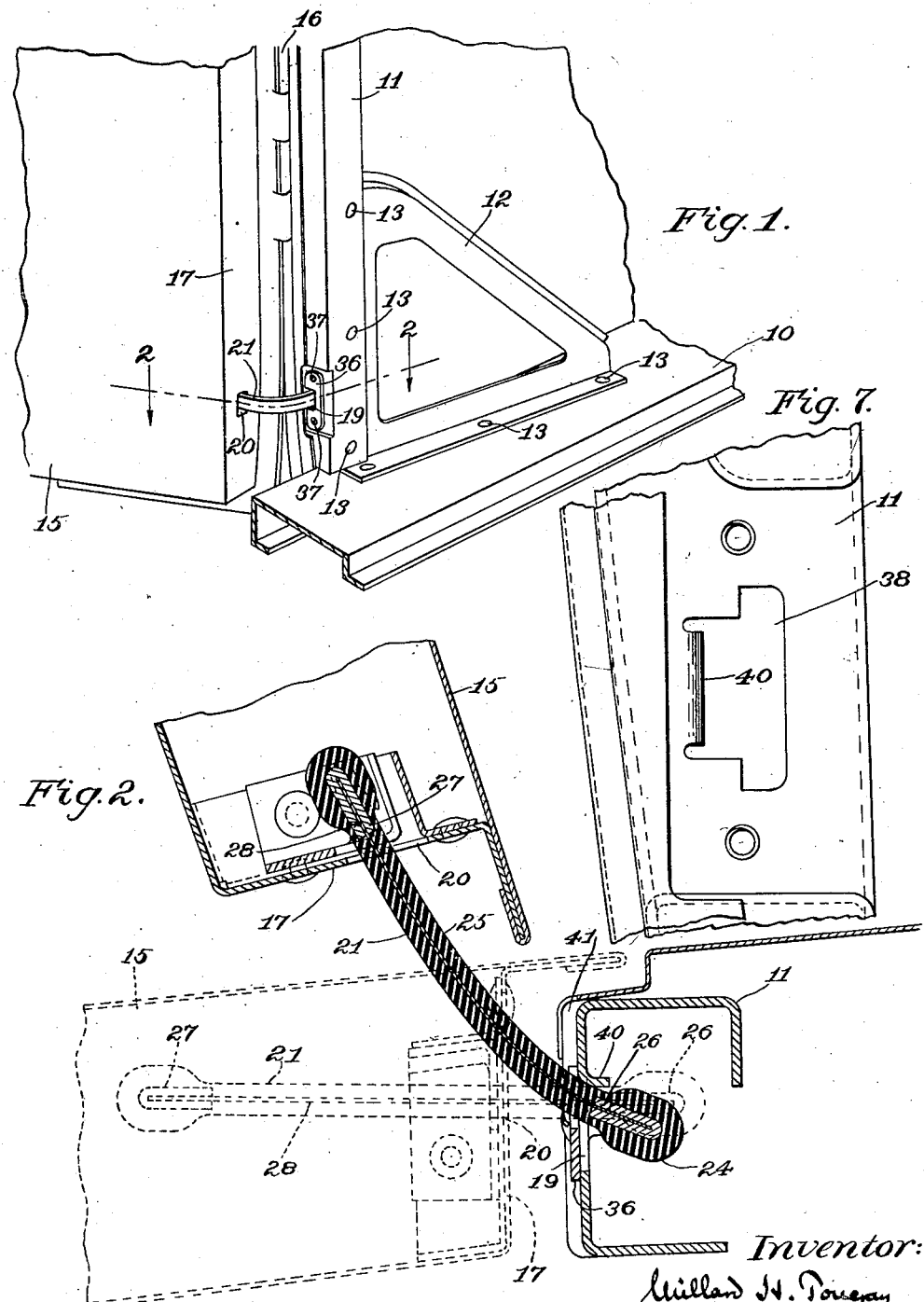

Patented Aug. 18, 1931

1,819,212

UNITED STATES PATENT OFFICE

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN

DOORSTOP STRAP

Application filed February 27, 1928. Serial No. 257,139.

This invention relates to a door stop strap for limiting the extent of opening of an automobile door.

The invention has for its object the provision of a stop strap of low cost which may be conveniently and readily assembled in position and is so constructed as to prevent rattling and excessive wear by movement relative to the parts with which it is connected.

The invention will be more clearly understood from the following description in conjunction with the accompanying drawings: in which, Fig. 1 is a perspective view of a portion of an automobile body embodying the stop strap of the invention;

Fig. 2 is a sectional plan view taken upon the line 2—2 of Fig. 1;

Fig. 3 is a sectional elevational view of the same taken through the stop strap;

Fig. 4 is a sectional view taken upon the line 4—4 of Fig. 3;

Fig. 5 is a sectional view taken upon the line 5—5 of Fig. 3;

Fig. 6 is a detail perspective view of the strap; and

Fig. 7 is a detail view of the opening in one of the pillars with the covering plate removed.

Before explaining in detail the present invention, and the method or mode of operation embodied therein, it is to be understood that the invention is not limited in its application to the details of construction and arrangement of parts illustrated in the accompanying drawings since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended or the requirements of the prior art.

An automobile body is illustrated in the drawings comprising a body sill 10 upon which is mounted a body pillar 11 which is reinforced by a bracket 12 secured to the body sill 10 and pillar 11 as by rivets 13. A door 15 is mounted upon the pillar 11 by a hinge 16 extending between and secured to the pillar 11 and door pillar 17 in any suitable manner. The pillars 11 and 17 are provided with openings 19 and 20 to receive the door strap 21.

In the form specifically illustrated the strap 21 comprises a body 25 of resilient material, such as rubber or the like, and is provided at each end with transverse stops 26 and 27 which are embedded in the resilient body 25 and project laterally therefrom on each side. The end portions 24 of the body 25 are thicker than the rest of the strap to provide sufficient resilient material surrounding the stops 26 and 27. The stops 26 and 27 may be of any suitable form or material but as illustrated each is formed by folding a strip of sheet metal to enclose the ends of a flexible reinforcing strip 28 which, preferably, is embedded in the resilient body. Preferably, one of the stops, such as the stop 26, extends laterally from the edges of the resilient body 25 a greater distance than the other for a purpose which will be more fully described hereinafter. A notch is provided in the edges of the resilient body 25 adjacent the inner edge of the stop 27 to form shoulders 29 spaced from said stop.

The interior surface adjacent the opening 20 of the door pillar 17 may be reinforced by a plate adapted to receive the impact of the stops. For this purpose, as illustrated, a two-piece bracket is employed comprising a member 30 adapted to engage the interior surface of the door pillar 17 and provided with flanges 32 which are secured, as by rivets 33 to the flanges 34 of a member 31, the latter being secured, as by rivets 35 to the pillar.

For convenience in assembling the strap in position between the door and body pillars the opening 19 in the pillar connects at one side with a relatively large opening 38 having a width at least equal to the length of the longest stop and which in effect forms part of the opening 19. The other edge of the opening 19 is provided with an inturned flange 40. A plate 36, preferably having an open notch 39 corresponding in size to the opening 19 or to the cross sectional area of the strap adjacent thereto, may be secured to the outer surface of the body pillar 11, as by screws 37, so as to close the relative large opening 38 and with the open notch 39 in alignment with the opening 19. Preferably, the portion 41 adjacent the openings 19 and 38 is offset to provide a recess to receive the plate 36.

In assembly, the end of the strap having the shortest stop 27 is passed through the opening 20 from the interior to the exterior of the door pillars 17 and is also passed through the relatively large opening 38 from the exterior to the interior of the body pillar 11 and moved laterally into the opening 19. The notch 39 in the plate 36 is then slipped over the notches 29 in the strap 21 and the plate secured to the pillar to prevent the withdrawal of the strap. In practice, the stop 26 is made of a length greater than the width of the opening 20. When thus assembled the notches 29 will engage the edge of the open notch 39 in the plate 36 and thereby prevent relative movement between the strap 21 and the body pillar 11. When the door 15 is closed the strap will assume the position shown in dotted lines in Fig. 2 and when the door is opened the strap will be drawn through the opening 20 until the stop 27 is brought into engagement with the interior surface of the bracket surrounding the opening 20 thereby limiting the extent of opening of the door and preventing injury to the door or other parts of the automobile. The flange 40 serves as a bearing surface for the strap 21 and prevents injury thereto.

I claim:

1. In combination with a body hinge pillar and a door including a door hinge pillar, a hinge connecting said pillars, a strap connecting said pillars and limiting the opening of said door, said strap having at one end a transverse stop of a length greater than the width of the strap adjacent thereto, one of said pillars being formed with an opening having a width at least equal to the length of the stop, said strap having a shoulder spaced from said stop, said stop being freely movable within the pillar and adapted to engage an abutment therein, and a plate partially closing said opening and adapted to engage said shoulder to prevent movement of the stop into said opening.

2. In combination with a body hinge pillar, and a door including a door hinge pillar, a hinge connecting said pillars, a strap connecting said pillars and limiting the opening of said door, said strap having at its end a transverse stop of a length greater than the width of the strap adjacent thereto, one of said pillars being formed with an opening having a relatively wide portion of a width at least equal to the length of the stop and a relatively narrow portion corresponding substantially to the width of the strap adjacent said stop, both portions of said opening extending to the exterior of the pillar, and a plate covering said relatively wide portion of said opening.

3. In combination with a body hinge pillar and a door including a door hinge pillar, a hinge connecting said pillars, a strap connecting the interior surfaces of said pillars and limiting the opening of said door, transverse stops at each end of said strap extending from the edges thereof, the transverse extensions of one stop being longer than those of the other stop, openings in said pillars having a width permitting the passage therethrough of the shortest stop, and a plate partially closing one of said openings.

4. In combination with a body hinge pillar and a door including a door hinge pillar, a hinge connecting said pillars, a strap connecting said pillars and limiting the opening of said door, transverse stops at each end of said strap extending from the edges thereof, the transverse extensions of one stop being longer than those of the other stop, openings in said pillars having a width permitting the passage therethrough of the shortest stop, a plate partially closing one of said openings, and means cooperating with one of said stops preventing movement of said strap relative to one of said openings.

In testimony whereof I affix my signature.

MILLARD H. TONCRAY.